US009376524B2

(12) United States Patent
Omura

(10) Patent No.: US 9,376,524 B2
(45) Date of Patent: Jun. 28, 2016

(54) COMPOSITION FOR FORMING THERMALLY-CURED COATING FILM AND THERMALLY-CURED COATING FILM

(71) Applicant: FUJIFILM Corporation, Minato-ku, Tokyo (JP)

(72) Inventor: Kazufumi Omura, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 169 days.

(21) Appl. No.: 14/227,762

(22) Filed: Mar. 27, 2014

(65) Prior Publication Data
US 2014/0296426 A1 Oct. 2, 2014

(30) Foreign Application Priority Data
Mar. 29, 2013 (JP) ................................. 2013-074338

(51) Int. Cl.
| C08F 220/34 | (2006.01) |
| C08F 220/36 | (2006.01) |
| C08F 290/06 | (2006.01) |
| C08F 290/14 | (2006.01) |
| C08F 299/06 | (2006.01) |
| C08G 18/08 | (2006.01) |
| C08G 18/32 | (2006.01) |
| C08G 18/66 | (2006.01) |
| C08G 18/67 | (2006.01) |
| C08G 18/68 | (2006.01) |
| C08G 18/83 | (2006.01) |

(52) U.S. Cl.
CPC .......... *C08G 18/0828* (2013.01); *C08F 220/36* (2013.01); *C08F 290/067* (2013.01); *C08F 290/147* (2013.01); *C08F 299/065* (2013.01); *C08G 18/3212* (2013.01); *C08G 18/6674* (2013.01); *C08G 18/672* (2013.01); *C08G 18/6795* (2013.01); *C08G 18/68* (2013.01); *C08G 18/835* (2013.01); *C08F 2220/343* (2013.01); *C08F 2220/346* (2013.01)

(58) Field of Classification Search
CPC ........... C08G 18/0828; C08G 18/6674; C08G 18/672; C08G 18/3212; C08G 18/6795; C08G 18/68; C08G 18/835; C08F 2220/343; C08F 2220/346; C08F 220/36; C08F 290/067; C08F 290/147; C08F 299/065
See application file for complete search history.

(56) References Cited

U.S. PATENT DOCUMENTS

| 6,924,008 | B2 | 8/2005 | Takai et al. |
| 7,737,304 | B2 | 6/2010 | Omura et al. |
| 7,737,305 | B2 | 6/2010 | Omura et al. |
| 8,044,197 | B2 | 10/2011 | Heischkel et al. |
| 2003/0032729 | A1 | 2/2003 | Takai et al. |
| 2007/0208101 | A1 | 9/2007 | Heischkel et al. |
| 2009/0087687 | A1 | 4/2009 | Omura et al. |
| 2009/0258254 | A1 | 10/2009 | Omura et al. |
| 2010/0068393 | A1 | 3/2010 | Bowman |
| 2012/0225969 | A1* | 9/2012 | Miyabayashi ...... C08F 290/067 522/53 |

FOREIGN PATENT DOCUMENTS

| JP | 60-120765 A | 6/1985 |
| JP | 2001-172556 A | 6/2001 |
| JP | 2001-176051 A | 6/2001 |
| JP | 2007-533664 A | 11/2007 |
| JP | 2009-096798 A | 5/2009 |
| JP | 2010-024255 A | 2/2010 |

OTHER PUBLICATIONS

Office Action dated Mar. 3, 2015, issued by the Japanese Patent Office in counterpart Japanese Application No. 2013-074338.
Office Action dated Oct. 27, 2015 from the Japanese Patent Office in counterpart Japanese Application No. 2013-074338.

* cited by examiner

*Primary Examiner* — Patrick Niland
(74) *Attorney, Agent, or Firm* — Sughrue Mion, PLLC

(57) ABSTRACT

The composition is a composition for forming a thermally-cured coating film, and comprises polyurethane resin comprising at least one group selected from the group consisting of a methacryloyloxy group, an acryloyloxy group, a methacryloyl group, and an acryloyl group; polythiol; and solvent.

18 Claims, No Drawings

COMPOSITION FOR FORMING THERMALLY-CURED COATING FILM AND THERMALLY-CURED COATING FILM

CROSS-REFERENCE TO RELATED APPLICATIONS

This application claims the benefit of priority under 35 USC 119 to Japanese Patent Application No. 2013-074338 filed on Mar. 29, 2013, which is expressly incorporated herein by reference in its entirety.

BACKGROUND OF THE INVENTION

1. Field of the Invention

The present invention relates to a composition for forming a thermally-cured coating film. More particularly, the present invention relates to a composition for forming a thermally-cured coating film that permits the formation of a coating comprising polyurethane resin that is intramolecularly or intermolecularly connected by a connecting group comprising two or more thioether bonds.

The present invention further relates to a thermally-cured coating film that has been formed by subjecting the above composition to heat treatment.

2. Discussion of the Background

Polyurethane resin can be prepared by subjecting a bifunctional or greater starting material alcohol and a bifunctional or greater starting material isocyanate to urethane reaction. The composition for forming a coating containing polyurethane resin thus prepared can be coated and dried on a support such as a base film to form a polyurethane-containing coating film. Such polyurethane-containing coatings are employed in a variety of fields. For example, in the magnetic recording field, compositions for forming coating films that contain polyurethane resin as binder in addition to ferromagnetic powder are used to form magnetic layers (for example, see Japanese Unexamined Patent Publication (KOKAI) No. 2001-176051, which is expressly incorporated herein by reference in its entirety).

SUMMARY OF THE INVENTION

The fact that a polyurethane-containing coating film is of high durability can enhance the durability of the product on which the coating film is present. In this regard, polyurethane resin is said to be generally strong resin. However, there is a need for even greater durability in polyurethane-containing coating films to achieve magnetic recording media that exhibit good running durability over extended periods, for example.

An aspect of the present invention provides for a polyurethane-containing coating film with high durability.

The present inventor conducted extensive research. This resulted in the new discovery that it was possible to form a polyurethane-containing coating film of high durability, and more particularly, to form a polyurethane-containing coating film with good elasticity, by subjecting (meth)acryloyl(oxy) group-containing polyurethane resin and polythiol to Michael addition reaction. In this context, (meth)acryloyl (oxy) group means at least one group selected from the group consisting of a methacryloyloxy group, an acryloyloxy group, a methacryloyl group, and an acryloyl group.

The above point will be further described below.

With regard to coating film durability, a coating film that lacks elasticity will be brittle and tend to break. For example, when the magnetic layer of a particulate magnetic recording medium lacks elasticity, for example, there may be a case where a portion of the film will be damaged with repeat running, drop off, or cause material to adhere to the head. Accordingly, increasing the elasticity of the coating film is an effective way to enhance coating film durability.

Using the above-mentioned Michael addition reaction to 1,4-add the thiol group of polythiol to the (meth)acryloyl (oxy) group of polyurethane resin can form polyurethane resin in which two (meth)acryloyl(oxy) groups are crosslinked by a connecting group derived from polythiol, either within or between polyurethane molecules. Here, the connecting group that connects the polyurethane resin molecules either intramolecularly or intermolecularly contains multiple thioether bonds derived from the thiol group contained in the polythiol. The present inventor newly discovered that by intramolecularly or intermolecularly crosslinking polyurethane resin by means of such a connecting group, it was possible to form a coating film that was readily extended by external forces (that is, was highly elastic). The present invention was devised on that basis.

An aspect of the present invention relates to a composition, which is a composition for forming a thermally-cured coating film, and comprises polyurethane resin comprising at least one functional group selected from the group consisting of a methacryloyloxy group, an acryloyloxy group, a methacryloyl group, and an acryloyl group; polythiol; and solvent.

In an embodiment, the main chain of a connecting group which connects thiol groups in the polythiol consists of carbon atoms, or consists of a combination of at least one carbon atom and at least one oxygen atom.

In an embodiment, the polythiol comprises a terminal group in the form of a thiol group.

In an embodiment, the above composition further comprises a base.

In an embodiment, the base is an organic base.

In an embodiment, the polythiol comprises three or more thiol groups within a molecule.

In an embodiment, the polythiol comprises at least one branched structure.

In an embodiment, the polythiol comprises three or more thiol groups within a molecule as well as comprises at least one branched structure.

In an embodiment, the polythiol comprises no hydroxyl group within a molecule.

In an embodiment, the above composition comprises no polyisocyanate.

In an embodiment, the polyurethane resin comprises at least one group selected from the group consisting of a sulfonic acid group and a sulfonate group.

In an embodiment, the polyurethane resin is polyurethane resin which has been prepared through urethane reaction with the use of diol comprising at least one functional group selected from the group consisting of a methacryloyloxy group, an acryloyloxy group, a methacryloyl group, and an acryloyl group.

In an embodiment, the solvent comprises equal to or greater than 60 weight percent of ketone solvent.

A further aspect of the present invention relates to a thermally-cured coating film, which has been prepared by subjecting the above composition to heat treatment.

In an embodiment, the above thermally-cured coating film comprises polyurethane resin which has been prepared through Michael addition reaction with the polythiol and the polyurethane resin comprising at least one group selected from the group consisting of a methacryloyloxy group, an acryloyloxy group, a methacryloyl group, and an acryloyl group, and which is intramolecularly or intermolecularly crosslinked by a connecting group derived from the polythiol.

An aspect of the present invention can yield a polyurethane-containing coating film affording good durability (high elasticity).

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

Composition for Forming Thermally-Cured Coating Film

An aspect of the present invention relates to a composition, which is a composition for forming a thermally-cured coating film, and comprises polyurethane resin comprising at least one (meth)acryloyl(oxy) group, that is, at least one group selected from the group consisting of a methacryloyloxy group, an acryloyloxy group, a methacryloyl group, and an acryloyl group; polythiol; and solvent (also referred to simply as a "composition", hereinafter).

A polyurethane-containing coating film of high elasticity can be formed by heating and curing the composition of an aspect of the present invention. This is presumed by the present inventor to occur because when the polyurethane resin and the polythiol undergo Michael addition reaction, polyurethane resin can be prepared in which the polythiol-derived connecting group intramolecularly or intermolecularly crosslinks the polyurethane. This point will be described below.

The Michael addition reaction is a reaction in which a nucleophile is 1,4-added to an α,β-unsaturated carbonyl compound. For example, in an embodiment in which polyurethane resin having one or more methacryloyloxy group is subjected to Michael addition reaction with a 1,3-propanedithiol, the proton of the thiol group is removed (deprotonated), and an anionic group —S$^-$ that is derived from the thiol group is generated. To generate the anionic group, it is desirable to conduct the Michael addition reaction in a solvent containing a base. That is because deprotonation takes place due to the base contained in the solvent, generating the anionic group. Accordingly, the composition of an aspect of the present invention desirably contains a base. Bases that are suitable for use will be described further below.

The anionic compound that has been generated, S$^-$—(CH$_2$)$_3$—S$^-$, is 1,4-added to the methacryloyloxy group contained in the polyurethane resin denoted by the reaction formula given below, as a nucleophilic agent. As a result, as shown in the reaction formula shown below, the polyurethane is intramolecularly or intermolecularly crosslinked by the crosslinking group comprising multiple thioethers (—S—). Such a crosslinked structure is thought to contribute to enhancing the elasticity of the polyurethane-containing coating film.

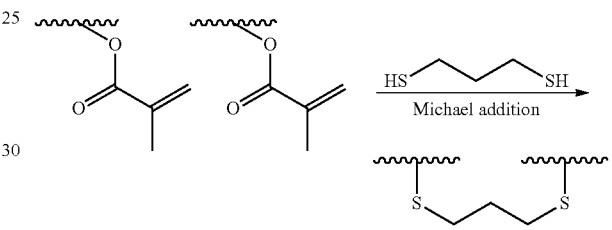

Having the composition of an aspect of the present invention contain a base can cause the Michael addition reaction to progress in the presence of a base. From the perspective of the reaction efficiency of the crosslinking reaction, it is desirable for the Michael addition reaction to take place in the presence of a base. However, instead of a base, it is possible for a catalyst, the use of which in the Michael addition reaction is known, to be added to the composition and for the Michael addition reaction to then be conducted.

The Michael addition reaction set forth above can cause the polythiol-derived crosslinking group to crosslink two (meth)acryloyl(oxy) groups.

The polyurethane resin that is contained in the composition of an aspect of the present invention contains (meth)acryloyl(oxy) groups. As set forth above, in the present invention, the term "(meth)acryloyl(oxy) group" is used with a meaning that includes an acryloyl group, a methacryloyl group, an acryloyloxy group, and a methacryloyloxy group. By 1,4-adding the deprotonated product of a polythiol to the (meth)acryloyl(oxy) group, it is possible to obtain polyurethane resin in which two (meth)acryloyl(oxy) groups are crosslinked by a polyol-derived crosslinking group.

The polyurethane resin employed above can generally be any commercially available radiation-curable polyurethane resin, or such a resin synthesized by a known method. For details regarding polyurethane resins that can be employed in the composition of an aspect of the present invention and methods of synthesizing them, reference can be made to Japanese Unexamined Patent Publication (KOKAI) No. 2009-96798, paragraphs [0015] to [0079], and the description of Examples, for example. The content of the above publication is expressly incorporated herein by reference in its entirety. By using a (meth)acryloyl(oxy) group-containing diol as the polyol component in the urethane reaction, it is possible to obtain polyurethane resin comprising a (meth) acryloyl(oxy) group in the main skeleton thereof, instead of, or in addition to, on the ends of the polyurethane. The polyurethane resin having a (meth)acryloyl(oxy) group on the main chain thereof is desirable because it will crosslink well with a polythiol. Here, by controlling the amount of diols employed, it is possible to obtain polyurethane resin comprising a desired quantity of (meth)acryloyl(oxy) groups. The crosslinking density can be controlled by means of the quantity of (meth)acryloyl(oxy) groups introduced.

Polyurethane resin is widely employed as binder in particulate magnetic recording media. Adsorptive functional groups that are capable of adsorbing to powder such as ferromagnetic powder and nonferromagnetic powder are desirably incorporated into polyurethane resin employed as such binder. That is because causing adsorptive functional groups to adsorb to the surface of the powder can prevent aggregation of the powder and can enhance dispersion.

Examples of adsorptive functional groups are sulfonic acid (salt) groups, carbonic acid (salt) groups, and phosphoric acid (salt) groups. The term "sulfonic acid (salt) group" is used with a meaning that includes the sulfonic acid group (—$SO_3H$), and sulfonate groups such as $SO_3Na$ groups, $SO_3K$ groups, and $SO_3Li$ groups. The same applies to carbonic acid (salt) groups and phosphoric acid (salt) groups. For example, the sulfonic acid (salt) group-containing polyurethane resin obtained using the sulfonic acid (salt) group-containing diol described in above Japanese Unexamined Patent Publication (KOKAI) No. 2009-96798 can be employed as a starting material polyurethane resin to obtain polyurethane resin having a sulfonic acid (salt) group in addition to a hydroxyl group. With regard to polyurethane resins employed as binders in magnetic recording media, from the perspectives of enhancing dispersion of powder and ensuring the solubility in solvent of the polyurethane resin, the content of the sulfonic acid (salt) group is desirably $1 \times 10^{-5}$ eq/g to $2 \times 10^{-3}$ eq/g, preferably $1 \times 10^{-5}$ eq/g to $1 \times 10^{-3}$ eq/g, and more preferably, $1 \times 10^{-5}$ eq/g to $5 \times 10^{-4}$ eq/g.

It suffices for the polythiol that is contained along with the polyurethane resin in the composition of an aspect of the present invention to be a compound having two or more thiol groups. The thiol groups can be positioned as a terminal group of the polythiol, or at positions other than as a terminal group. The polythiols can be of a linear structure, or of a branched structure. The connecting groups connecting the thiol groups are not specifically limited. However, they desirably do not contain urethane bonds from the perspective of enhancing the elasticity of the coating. Examples of such connecting groups are connecting groups the main chain of which consists of carbon atoms and connecting groups the main chain of which consists of a combination of at least one carbon atom and at least one oxygen atom, for example.

Specific examples of polythiols are 1,2-ethanedithiol, butanedithiol, 1,3-propanedithiol, 1,5-pentanedithiol, 2,3-dimercapto-1-propanol, dithioerythritol, 3,6-dioxa-1,8-octanedithiol, 1,8-octanedithiol, hexanedithiol, dithiodiglycol, pentanedithiol, decanedithiol, 2-methyl-1,4-butanedithiol, bis-mercaptoethylphenylmethane, 1,9-nonanedithiol(1,9-dimercaptononane), glycol dimercaptoacetate, 3-mercapto-β,4-dimethyl-cyclohexaneethanethiol, cyclohexanedimethanedithiol, 3,7-dithia-1,9-nonanedithiol, and other fatty acid bifunctional thiol compounds; 1,2-benzenedithiol, 1,3-benzenedithiol, 1,4-benzenedithiol, 2,4,6-trimethyl-1,3-benzenedimethanethiol, zulene-α1, α2-dithiol, 3,4-dimercaptotoluene, 4-methyl-1,2-benzenedithiol, 2,5-dimercapto-1,3,4-thiadiazole, 4,4'-thiobisbenzenedithiol(4,4'-thiobisbenzenedithiol), bis(4-mercaptophenyl)-2,2'-propane (bisphenoldithiol), and other aromatic bifunctional thiols; trimethylolethane trismercaptopropionate, trimethylolpropane trismercaptopropionate (TMPTSH), trimethylolethane trismercaptoacetate, trimethylolpropane trismercaptoacetate, glyceroltri(11-mercaptoundecate), trimethylolpropanetri(11-mercaptoundecate), and other tribunctional thiols; pentaerythritol tetramercaptopropionate, pentaerythritol tetramercaptoacetate, pentaerythritol tetra(11-mercaptoundecate), and other tetrafunctional thiols. Of these, from the perspective of forming a coating film of higher elasticity, trifunctional and higher compounds, compounds having one or more branched structures, and compounds that are trifunctional and higher and have one or more branched structures, are desirable.

The composition of an aspect of the present invention can be prepared by adding the polyurethane resin and polythiol set forth above to solvent and mixing them. One or more types of polyurethane resin and one or more types of polythiol can be employed in combination.

As set forth above, the composition of an aspect of the present invention can also comprise a base. Both organic and inorganic bases can be employed. From the perspective of solubility in solvent, an organic base is desirably employed. Examples of organic bases that can be employed are: 1,8-diazabicyclo[5.4.0]undeca-7-ene (DBU), triethylamine, tripropylamine, tributylamine, triamylamine, trihexylamine, trioctylamine, pyridine, and picoline. To accelerate the reaction, the use of a strong base is desirable. The use of a base with a base strength pKb falling within a range of 6.50 to 13.0 is preferred. In the present invention, the term "base strength" is a value that is measured by the following method.

A 50 mg quantity of sample is dissolved in a mixed liquid of 20 mL of water and 30 mL of tetrahydrofuran. A GT-100 Win Automatic Titrator, made by Mitsubishi Chemical Analytech Co., Ltd. is used to add drops of 0.1 N-HCl (Wako Junyaku) and perform a neutralization titration. The pH corresponding to half the number of drops added to reach the neutral point is read, and that pH is adopted as the base strength (pKb). The quantity of base employed can be about 0.001 part to 100 parts by weight per 100 parts by weight of the polythiol, for example.

It suffices for the organic solvent employed to be selected based on exhibiting a good ability to dissolve the polythiol employed. Examples of solvent that can be employed are, in any proportions: acetone, methyl ethyl ketone, methyl isobutyl ketone, diisobutyl ketone, cyclohexanone, isophorone, tetrahydrofuran, and other ketones; methanol, ethanol, propanol, butanol, isobutyl alcohol, isopropyl alcohol, methyl cyclohexanol, and other alcohols; methyl acetate, butyl acetate, isobutyl acetate, isopropyl acetate, ethyl lactate, glycol acetate, and other esters; glycol dimethyl ether, glycol monoethyl ether, dioxane, and other glycol ethers; benzene, toluene, xylene, cresol, chlorobenzene, and other aromatic hydrocarbons; methylene chloride, ethylene chloride, carbon tetrachloride, chloroform, ethylene chlorohydrin, dichlorobenzene, and other chlorinated hydrocarbons; N,N-dimethylformamide; and hexane. Since thiol compounds generally have good solubility in ketone solvents, the use of solvent in which ketone solvent is contained equal to or greater than 60 weight percent of the total solvent is desirable. It is also possible to employ 100 percent ketone solvent. Since ketone solvents have relatively low boiling points and tend to volatize, they are desirable as solvents from the perspective of ease of drying the coating film.

The quantity of the above polyurethane resin in the solvent can be 1 weight part to 40 weight parts per 100 weight parts of solvent, for example. From the perspective of getting the polythiol to form a crosslinked structure of high crosslink density and a high-strength coating film, the quantity of (meth)acryloyl(oxy) groups contained in the polyurethane resin is desirably equal to or more than 25 mol/t. From the perspective of the stability of the compound, the quantity of (meth)acryloyl(oxy) groups contained in the polyurethane resin is desirably less than 2,500 mol/t. When the viscosity of the liquid is taken into account, the quantity of (meth)acryloyl (oxy) groups contained in the polyurethane resin is desirably equal to or more than 25 mol/t, and less than 1,000 mol/t. Additionally, the quantity of polythiol can be equimolar or greater, or even less, than the quantity of (meth)acryloyl(oxy) groups contained in the starting material polyurethane resin.

Further, the composition of an aspect of the present invention can optionally contain additives based on the application of the coating film, in addition to the above components. In the composition of an aspect of the present invention, since polythiol can functions as a crosslinking agent, it is possible not to incorporate polyisocyanate, which is widely employed as a crosslinking agent. Accordingly, it is possible for the polyurethane resin not to contain polyisocyanate or hydroxyl groups, which are functional groups in the urethane reaction. The Michael addition reaction can be normally conducted without adding polymerization initiators.

Thermally-Cured Coating Film

A further aspect of the present invention relates to a thermally-cured coating film (also referred to simply as a "coating", hereinafter), which has been prepared by subjecting the above composition to heat treatment.

The coating film of an aspect of the present invention can be formed by coating the composition of an aspect of the present invention on a support, for example, and inducing a Michael addition reaction. Normally, the Michael addition reaction can be conducted without adding a polymerization initiator, as stated above. Normally, it will proceed without an operation such as light irradiation, electron-beam irradiation, or irradiation with radiation. Hearing and curing by the Michael addition reaction can be conducted, for example, at a room temperature of 15° C. to 30° C. Alternatively, conducting the heat treatment at equal to or higher than 30° C. permits the more rapid formation of a coating film. For example, the heat treatment temperature for forming a thermally-cured coating film can be conducted for about 1 minute to 3 hours at a heating temperature of about 30° C. to 150° C. The atmosphere in which the heat treatment is conducted is not specifically limited. It can be conducted in air, under a vacuum, in an inert atmosphere, or the like. Following the heat treatment, annealing may be conducted for from 1 hour to about 1 week at about 50° C. to 100° C. to increase the stability of the film.

As set forth above, the thermally-cured coating film of an aspect of the present invention can contain polyurethane resin, formed by subjecting (meth)acryloyl(oxy) group-containing polyurethane resin and polythiol to Michael addition reaction, that is intramolecularly or intermolecularly crosslinked by the polythiol-derived connecting group. Such polyurethane resin can exhibit high elasticity. Thus, the thermally-cured coating film of an aspect of the present invention is a coating film that can exhibit high durability and tend not to fracture because it can extend readily in response to external forces.

The thermally-cured coating film of an aspect of the present invention as set forth above can be employed in various applications where high coating film strength is required. For example, the coating of an aspect of the present invention is suitable as the magnetic layer, nonmagnetic layer, and backcoat layer of a particulate magnetic recording medium. The thermally-cured coating film of an aspect of the present invention can be applied to particulate magnetic recording media without any limitation on known techniques relating to particulate magnetic recording media. For example, reference can be made with regard to the magnetic layer to Japanese Unexamined Patent Publication (KOKAI) No. 2011-216179, paragraphs [0018] to [0027]; with regard to nonmagnetic layers, to the same publication, paragraphs [0028] to [0176], and with regard to nomagnetic supports, layer configuration, manufacturing methods, and details pertaining thereto, to the same publication, paragraphs [0177] to [0187], and to Examples described therein. The content of the above publication is expressly incorporated herein by reference in its entirety.

EXAMPLES

The present invention will be described in detail below based on Examples. However, the present invention is not limited to Examples. A 400 MHz NMR (AVANCEII-400 made by Bruker Corp.) was employed in the $^1$H NMR measurements given below.

Methacryloyloxy group-containing polyurethane resin is referred to as Type A polyurethane below.

Example 1

1. Synthesis of Sulfonate Group-Containing Diol

To 250 weight parts of water were added 100 weight parts of 2-aminoethanesulfonic acid and 44.8 weight parts of potassium hydroxide. The mixture was stirred for 30 minutes at 45° C. To this were added 213.3 weight parts of butyl glycidyl ether and the mixture was stirred for 2 hours at 45° C. To this were then added 400 weight parts of toluene and the mixture was stirred for 10 minutes and left standing. The lower layer was separated. The separated lower layer was solidified and dried, yielding sulfonate group-containing compound (S-1). $^1$H NMR assignments are given below for (S-1).

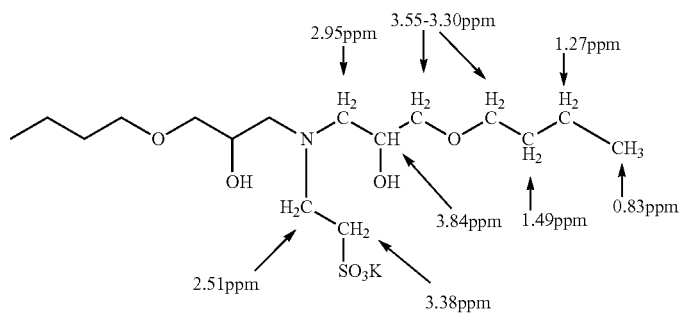

2. Synthesis of Type A Polyurethane

To 50.5 weight parts of cyclohexanone were added 1.0 weight part of sulfonate group-containing compound (S-1), 8.7 weight parts of polyether polyol (Adeka polyether BPX-1000, made by Adeka), 7.5 weight parts of tricyclo[5,2,1,0(2,6)] decane dimethanol (made by Tokyo Chemical Industry Co.), 1.9 weight part of glycerine monomethacrylate (Bremmer GLM, made by NOF Corporation), 0.01 weight part of dibutyltin dilaurate, and 0.003 weight part of p-methoxyphenol (made by Wako Pure Chemical Industries). The mixture was stirred for 30 minutes at room temperature and fully dissolved. The moisture within the flask was measured with a Karl Fischer moisture meter and a number of cools of diphenylmethane diisocyanate (MDI) (Millionate MT, made by Nippon Polyurethane Industry Co., Ltd.) equal to that of the water contained was added. The internal temperature was set to 80° C., after which 15.3 weight parts of powder of diphenylmethane diisocyanate (Millionate MT, made by Nippon Polyurethane Industry Co., Ltd.) was added in increments at a rate that yielded an internal temperature of 80° C. to 90° C. The mixture was stirred for 5 hours at an internal temperature of 80° C. to 90° C., and then cooled to room temperature. A 29.5 weight part quantity of cyclohexanone was added, yielding Type A polyurethane 1 (A-1) solution.

The weight average molecular weight of Type A polyurethane resin 1 (A-1) obtained and the ratio of the weight average molecular weight/number average molecular weight (Mw/Mn) were obtained using DMF solvent containing 0.3 weight percent of lithium bromide by conversion to standard polystyrene. The weight average molecular weight was 70,000 and Mw/Mn=1.90.

3. Preparation of the Composition for Forming a Thermally-Cured Coating Film and Fabrication of a Thermally-Cured Coating Film To 100 weight parts of Type A polyurethane 1 (A-1) solution (a cyclohexanone solution containing 30 weight percent of polyurethane A-1) were admixed 4.5 weight parts of trimethylolpropane tris(3-mercaptopropionate) made by Tokyo Chemical Industry Co., 35 weight parts of 2-butanone (methylethylketone), and 0.03 weight parts of 1,8-diazabicyclo[5.4.0]undeca-7-ene (DBU) made by Tokyo Chemical Industry Co. Subsequently, a doctor blade was used to apply the mixture with a 300 µm gap to a base film (Torelina (registered trademark) film 3000, made by Toray Industries and the coating film was vacuum dried for 30 minutes at 140° C. The dry film obtained was cooled to room temperature and annealed for two days at 70° C. The annealed film thus obtained was cooled to room temperature and the base film was separated, yielding a polyurethane film (thermally-cured coating film).

When the film obtained was measured by the method set forth below to determine the elongation at break, it exceeded 250%.

(Method of Measuring Elongation at Break)

The film obtained was cut to a width of 6.35 mm and a chuck spacing of 50 mm. The chuck spacing was set to 50 mm on Strograph V1-C made by Toyoseiki, and the test speed was set to 50 mm/min. The elongation (%) when the film broke was adopted as the elongation at break.

Comparative Example 1

With the exception that the 4.5 weight parts of polythiol (trimethylolpropane tris(3-mercaptopropionate), made by Tokyo Chemical Industry Co.) were not employed, a polyurethane film was obtained by the same method as in Example 1.

The elongation at break of the film obtained, as tested by the above method, was 4.1%.

By comparing Example 1 and Comparative Example 1, it was determined that an aspect of the present invention can permit the formation of a thermally-cured coating film of high elasticity.

The present invention is useful in the field of manufacturing various products to which polyurethane coating films are applied.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A composition, which is a composition for forming a thermally-cured coating film, and comprises polyurethane resin comprising at least one group selected from the group consisting of a methacryloyloxy group, an acryloyloxy group, a methacryloyl group, and an acryloyl group; polythiol; and solvent,
   wherein the polyurethane resin is polyurethane resin which has been prepared through a urethane reaction employing as a starting material a diol comprising at least one group selected from the group consisting of a methacryloyloxy group, an acryloyloxy group, a methacryloyl group, and an acryloyl group.

2. The composition according to claim 1, wherein a main chain of a connecting group which connects thiol groups in the polythiol consists of carbon atoms, or consists of a combination of at least one carbon atom and at least one oxygen atom.

3. The composition according to claim 1, wherein the polythiol comprises a terminal group in the form of a thiol group.

4. The composition according to claim 2, wherein the polythiol comprises a terminal group in the form of a thiol group.

5. The composition according to claim 1, which further comprises a base.

6. The composition according to claim 5, wherein the base is an organic base.

7. The composition according to claim 1, wherein the polythiol comprises three or more thiol groups within a molecule.

8. The composition according to claim 1, wherein the polythiol comprises at least one branched structure.

9. The composition according to claim 1, wherein the polythiol comprises three or more thiol groups within a molecule as well as comprises at least one branched structure.

10. The composition according to claim 2, wherein the polythiol comprises three or more thiol groups within a molecule.

11. The composition according to claim 2, wherein the polythiol comprises at least one branched structure.

12. The composition according to claim 2, wherein the polythiol comprises three or more thiol groups within a molecule as well as comprises at least one branched structure.

13. The composition according to claim 1, wherein the polythiol comprises no hydroxyl group within a molecule.

14. The composition according to claim 1, which comprises no polyisocyanate.

15. The composition according to claim 1, wherein the polyurethane resin comprises at least one group selected from the group consisting of a sulfonic acid group and a sulfonate group.

16. The composition according to claim 1, wherein the solvent comprises equal to or greater than 60 weight percent of ketone solvent.

17. A thermally-cured coating film, which has been prepared by subjecting the composition according to claim 1 to heat treatment.

18. The thermally-cured coating film according to claim 17, which comprises polyurethane resin which has been prepared through Michael addition reaction with the polythiol and the polyurethane resin comprising at least one group selected from the group consisting of a methacryloyloxy group, an acryloyloxy group, a methacryloyl group, and an acryloyl group, and which is intramolecularly or intermolecularly crosslinked by a connecting group derived from the polythiol.

* * * * *